US012355801B2

(12) United States Patent
Bakman et al.

(10) Patent No.: US 12,355,801 B2
(45) Date of Patent: Jul. 8, 2025

(54) MATCHING COMMON VULNERABILITIES AND EXPOSURES

(71) Applicant: FORESCOUT TECHNOLOGIES, INC., San Jose, CA (US)

(72) Inventors: Maxim Bakman, Tel Aviv (IL); Julia Ballos Shefi, Tel Aviv (IL)

(73) Assignee: Forescout Technologies, Inc., San Jose, CA (US)

(*) Notice: Subject to any disclaimer, the term of this patent is extended or adjusted under 35 U.S.C. 154(b) by 341 days.

(21) Appl. No.: 17/937,385

(22) Filed: Sep. 30, 2022

(65) Prior Publication Data
US 2023/0319094 A1    Oct. 5, 2023

Related U.S. Application Data

(60) Provisional application No. 63/326,587, filed on Apr. 1, 2022.

(51) Int. Cl.
*H04L 9/40*     (2022.01)
*G06F 40/205*   (2020.01)

(52) U.S. Cl.
CPC ........ *H04L 63/1433* (2013.01); *G06F 40/205* (2020.01); *H04L 63/1425* (2013.01)

(58) Field of Classification Search
CPC ............. H04L 63/1433; H04L 63/1425; G06F 40/205
USPC ................................................. 726/25
See application file for complete search history.

(56) References Cited

U.S. PATENT DOCUMENTS

| | | | |
|---|---|---|---|
| 10,200,407 B1* | 2/2019 | Dawkins | H04L 51/18 |
| 11,706,241 B1* | 7/2023 | Cross | H04L 63/20 726/25 |
| 2014/0032418 A1* | 1/2014 | Weber | G06Q 20/385 705/77 |
| 2015/0173521 A1* | 6/2015 | Mendi | A47C 20/026 5/706 |
| 2015/0193621 A1* | 7/2015 | Barouni Ebrahimi | H04L 63/1433 726/25 |
| 2016/0248800 A1* | 8/2016 | Ng | G06Q 40/06 |
| 2017/0017959 A1* | 1/2017 | Keresman, III | H04L 63/0428 |
| 2019/0163914 A1* | 5/2019 | Steele | H04L 63/20 |
| 2021/0173935 A1* | 6/2021 | Ramasamy | G06F 21/577 |
| 2021/0288991 A1* | 9/2021 | Shakarian | H04L 41/16 |
| 2021/0406255 A1* | 12/2021 | Raghuramu | H04L 43/08 |
| 2022/0019673 A1* | 1/2022 | Serna | G06F 21/577 |

(Continued)

*Primary Examiner* — Dant B Shaifer Harriman
(74) *Attorney, Agent, or Firm* — Womble Bond Dickinson (US) LLP

(57) ABSTRACT

Systems and methods for identifying common vulnerabilities and exposures (CVEs) associated with an entity are described. The identification of the CVEs for an entity includes accessing entity security vulnerabilities and exposures, extracting one or more keywords from each of the entity security vulnerabilities and exposures, and accessing entity property data associated with an entity coupled to a network. The identification further includes comparing the one or more keywords from each of the entity security vulnerabilities and exposures to the entity property data associated with the entity coupled to the network, and determining one or more entity security vulnerabilities and exposures that are associated with the entity coupled to the network based on the comparing of the one or more keywords and the entity property data.

17 Claims, 7 Drawing Sheets

(56) References Cited

U.S. PATENT DOCUMENTS

| | | | |
|---|---|---|---|
| 2022/0148001 A1* | 5/2022 | Rafferty | G06N 3/08 |
| 2022/0269791 A1* | 8/2022 | Ansell | G06F 21/577 |
| 2022/0286474 A1* | 9/2022 | Kuppa | H04L 63/145 |
| 2023/0208848 A1* | 6/2023 | Fainberg | H04L 63/101 |
| | | | 726/3 |
| 2023/0216875 A1* | 7/2023 | Barbosa | H04L 63/1416 |
| | | | 726/25 |
| 2023/0275818 A1* | 8/2023 | Raghuramu | H04L 63/1408 |
| 2023/0315991 A1* | 10/2023 | Zhang | G06F 21/552 |
| 2023/0319094 A1* | 10/2023 | Bakman | H04L 63/1425 |
| | | | 726/25 |
| 2023/0319095 A1* | 10/2023 | Kalbo | H04L 63/1425 |
| | | | 726/25 |
| 2023/0336581 A1* | 10/2023 | Dunn | G06F 21/577 |
| 2023/0344853 A1* | 10/2023 | Gallagher | H04L 63/1433 |
| 2024/0070313 A1* | 2/2024 | Singh | G06F 21/6245 |
| 2024/0111876 A1* | 4/2024 | Griffin | G06F 21/577 |

* cited by examiner

MATCHING COMMON VULNERABILITIES AND EXPOSURES

RELATED APPLICATIONS

This application claims priority from and the benefit of U.S. Provisional Patent Application No. 63/326,587 filed on Apr. 1, 2022, the entire contents of which is incorporated herein by reference in its entirety.

TECHNICAL FIELD

Aspects and implementations of the present disclosure relate to network monitoring, and more specifically, identification and matching of common vulnerabilities and exposures (CVEs) for devices of a network.

BACKGROUND

As technology advances, the number and variety of devices or entities that are connected to communications networks are rapidly increasing. Each device or entity may have its own respective vulnerabilities which may leave the network open to compromise or other risks. Preventing the spreading of an infection of a device or entity, or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
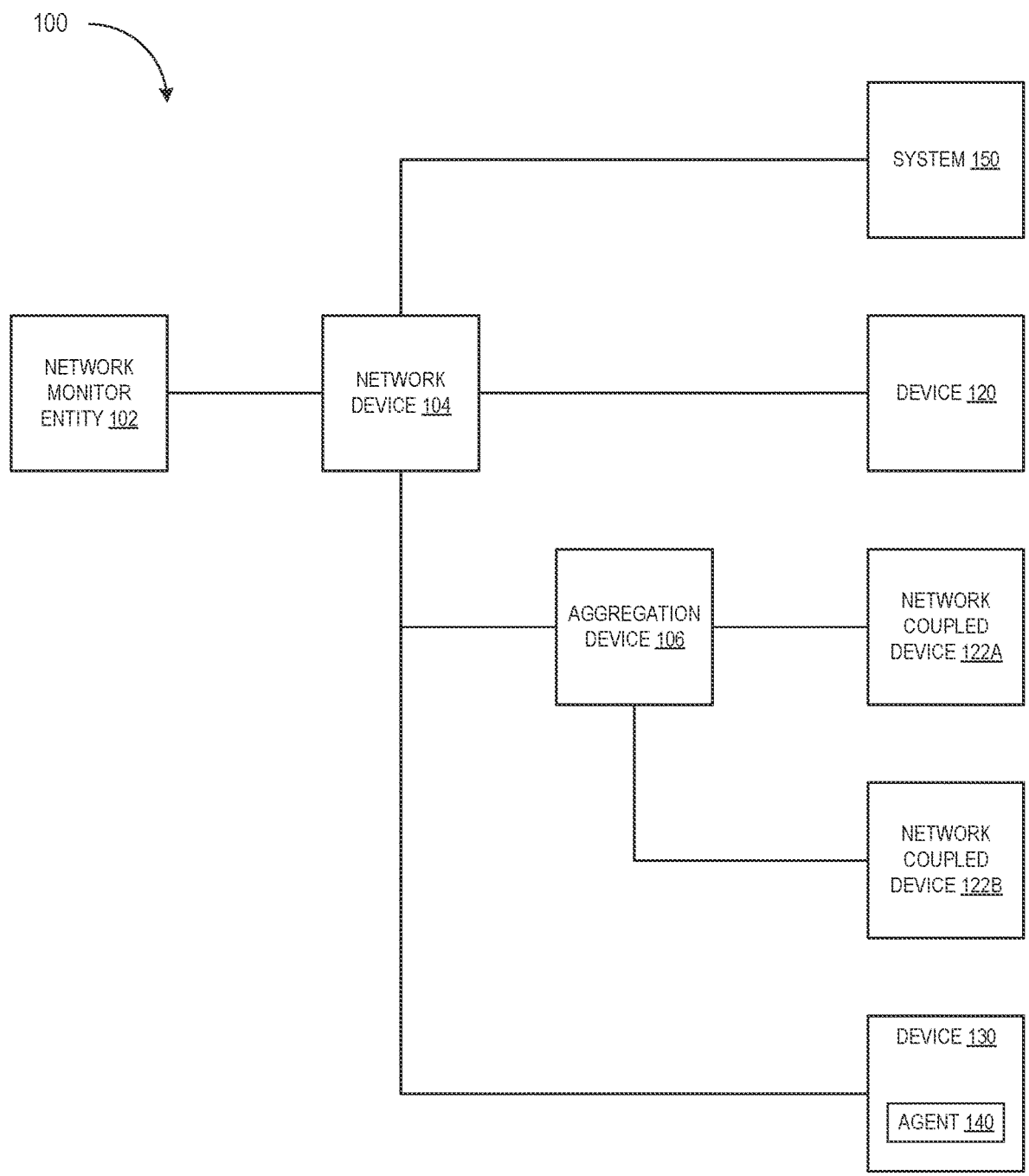
FIG. 1 depicts an illustrative communication network in accordance with one implementation of the present disclosure.

Aspects and implementations of the present disclosure are related to CVE identification and matching for entities of a network. The systems and methods disclosed can be employed with respect to network security, among other fields. More particularly, it can be appreciated that devices or entities with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification of devices, CVE identification and determination, and risk assessment can be particularly important for securing a network because lack of knowledge about what an entity is and potential vulnerabilities of the entity can prevent application of appropriate security measures. Accordingly, described herein in various implementations are systems, methods, techniques, and related technologies, which allow for improved CVE identification and determination to be used for entity risk assessment and vulnerability remediation.

Conventionally, CVEs are manually analyzed to arrive at data in a format that can be used for various security functionalities. However, with the current volume of CVEs, constant releases of new CVEs, and multiple sources of CVEs (e.g., different curators/providers) the manual analysis of CVEs for devices of a network can be very resource and time intensive. Furthermore, additional manual analysis may be needed when there are new models of equipment (e.g., networking equipment) and operating systems (e.g., operating system versions) added to a network. For example, additional CVEs may need to be identified and associated with each new model release of a device or entity, any entities or devices added to the network, or any other updates or changes to devices or entities of the network.

Accordingly, described herein in various implementations are systems, methods, techniques, and related technologies, which improve CVE identification and determination for entities coupled to a network. Embodiments may overcome the problems of conventional CVE determination by extracting keywords from CVEs and any other security information sources to match and identify CVEs that are relevant to devices of a network. Techniques may also extract keywords or parts of data from a set of properties or other information gathered for an entity (referred to herein as "entity property data"), or entities coupled to a network. For example, entity property data may be collected for entities coupled to a network using passive or active monitoring techniques, as described herein. Processing logic may compare the keywords extracted from the CVEs or other security information source with the entity property data to determine any matches between entities and CVEs. In some embodiments, the matching of the entity property data with the extracted keywords for the CVEs may be performed based on one or more heuristic rules, machine learning techniques, or any other matching techniques. For example, the rules may define which types or portions of extracted keywords and entity property data must match in order to determine that the CVE is associated with (e.g., corresponds to) the entity. Any number of rules may be defined for determining a match. The CVEs determined to be associated with an entity based on the matching may be used, at least in part, to compute a risk score associated with the entity. Additionally, the CVEs determined to be associated with an entity may provide information to be used to remediate or reduce vulnerabilities of the entity (e.g., by applying appropriate security measures, access policies, updates, etc.)

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which an entity can access or communicate with. Segmentation or "zoning" can provide effective controls to limit movement across the network (e.g., by a hacker or malicious software). Enforcement points including firewalls, routers, switches, cloud infrastructure, other network devices/entities, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its entities and the amount of work or labor involved in configuring network entities.

Although embodiments are described herein with reference to network devices, embodiments also apply to any entity communicatively coupled to the network. An entity or entities, as discussed herein, include devices (e.g., computer systems, for instance laptops, desktops, servers, mobile devices, IoT devices, OT devices, etc.), endpoints, virtual machines, services, serverless services (e.g., cloud-based services), containers (e.g., user-space instances that work with an operating system featuring a kernel that allows the existence of multiple isolated user-space instances), cloud-based storage, accounts, and users. Depending on the entity, an entity may have an IP address (e.g., a device) or may be without an IP address (e.g., a serverless service).

The enforcement points may be one or more network entities (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any entity that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122A-B. The devices 120 and 130 and network coupled devices 122A-B may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices/entities of communication network 100 may communicate in a variety of ways including wired and wireless connections and may use one or more of a variety of protocols.

Network device 104 may be one or more network entities configured to facilitate communication among aggregation device 106, system 150, network monitor entity 102, devices 120 and 130, and network coupled devices 122A-B. Network device 104 may be one or more network switches, access points, routers, firewalls, hubs, etc.

Network monitor entity 102 may be operable for a variety of tasks including collecting entity property data and identifying CVEs that are associated with (e.g., corresponding to) the entities of a network, as described herein. Network monitor entity 102 may parse CVE documentation to extract keywords for the CVE documentation. The network monitor entity 102 may compare the keywords from the CVE documentation to entity property data (e.g., keywords and data from properties and features collected for an entity) of network coupled devices 122A-B. The network monitor entity 102 may determine, based on one or more heuristic rules, whether a CVE is associated with (e.g., corresponds to) an entity. The network monitor entity 102 may further determine a risk score associated with the entity based on the one or more CVEs determined to be associated with the entity. In some embodiments, network monitor entity 102 can use local resources (e.g., processing, memory, data resources, or other resources), cloud resources, or a combination thereof for performing the determination of CVEs being associated with entities of a network. In some examples, the network monitor entity 102 may determine access policies or other security policies to be applied to the entities of the network based on the CVEs associated with one or more devices on the network and the risk scores determined for the one or more devices on the network.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor entity 102. External or 3$^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122A-B. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122A-B on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor entity 102. In some examples, the VA system may parse CVE documentation to extract keywords for the CVE documentation. The VA system may compare the keywords from the CVE documentation to entity property data (e.g., keywords and data from properties and features collected for an entity) of network coupled devices 122A-B. The VA system may determine, based on one or more heuristic rules, whether a CVE is associated with or corresponds to an entity. The VA system may further determine a risk score associated with the entity based on the CVEs determined to correspond to or be associated with the entity.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to an entity being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network entities (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other entities (e.g., ZigBee', Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122A-B and provide network access to network coupled devices 122A-B. Aggregation device 106 may further be configured to provide information (e.g., operating system, device software information, device software versions, device names, application present, running, or both, vulnerabilities, patch level, etc.) to network monitor entity 102 about the network coupled devices 122A-B. Aggregation device 106 may be a wireless access point that is configured to communicate with a wide variety of entities through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122A-B via a wireless connection. Aggregation device 106 may be configured to communicate with network coupled devices 122A-B using a standard protocol with proprietary extensions or modifications.

Aggregation device 106 may further provide log information of activity and attributes of network coupled devices 122A-B to network monitor entity 102. It is appreciated that log information may be particularly reliable for stable network environments (e.g., where the types of entities on the network do not change often). The log information may include information of updates of software of network coupled devices 122A-B.

Figure 2:
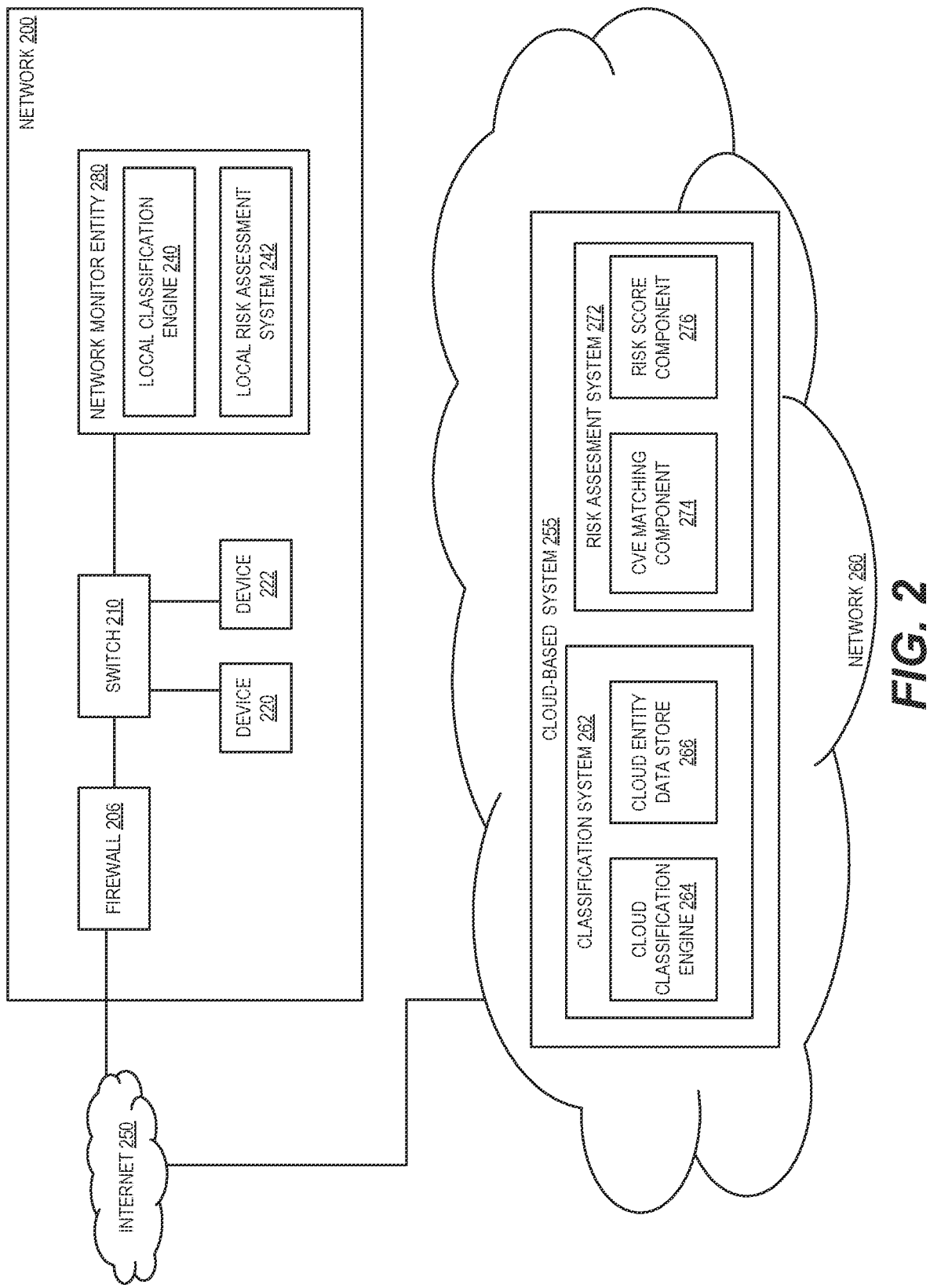
FIG. 2 depicts an illustrative network topology in accordance with one implementation of the present disclosure.

FIG. 2 depicts an example network 200 with multiple enforcement points (e.g., firewall 206 and switch 210) and a network monitor entity 280 (e.g., network monitor entity 102) which can perform device classification using logic programming, such as heuristic rules with associated uncertainties, and provide explanations of resulting classifications, as described herein, associated with the various entities communicatively coupled in example network 200.

FIG. 2 further shows example devices 220-222 (e.g., devices 106, 122A-B, 120, and 130, other physical or virtual devices, other entities, etc.) and it is appreciated that more or fewer network entities or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based entity or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various entities of network 200 including firewall 206, network monitor entity 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein. Network 200 is communicatively coupled (e.g., via Internet 250) to network 260. Network 260 may be a cloud-based network or other network that communicatively couples classification system 262 and risk assessment system 272. Network 260 may be a network of devices or entities that are communicatively connected for executing computing workloads and storing data (e.g., data from network monitor entity 280). For example, classification system 262 and risk assessment system 272 may be part of a cloud-based system 255 (e.g., security system, component, etc.) for entity monitoring, entity classification, CVE matching for entities, and entity risk assessment of devices (e.g., devices 220-222) of network 200.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of an entity of network 200 by sending one or more requests to the entity of network 200. The information from passive and active scans of entities of network 200 can be used to determine one or more features associated with the entities of network 200 (e.g., evidence).

Network monitor entity 280 includes local classification engine 240 which may perform classification of the entities of network 200 including firewall 206, switch 210, and devices 220-222. Local classification engine 240 may designate attributes and classify one or more entities of network 200 based on the information collected for the entities. Local classification engine 240 can send data (e.g., attribute values) about entities of network 200, as determined by local classification engine 240, to classification system 262. Local classification engine 240 may encode and encrypt the data prior to sending the data to classification system 262. Local classification engine 240 may receive a classification from classification system 262 which network monitor entity 280 can use to perform various security related measures. In some embodiments, classification of an entity may be performed in part by local network monitor entity 280 (e.g., local classification engine 240) and in part by classification system 262.

Classification system 262 may be a cloud classification system operable to perform device classification, as described herein. In some embodiments, classification system 262 may be part of a larger system operable to perform a variety of functions, e.g., part of a cloud-based network monitor entity, security device, etc. For example, classification system 262 can perform cloud-based classification of devices. Cloud classification engine 264 may perform classification of devices of the network 200 (e.g., devices 220-222). For example, cloud classification engine 264 may classify, or fingerprint, devices based on device profiles (e.g., device properties, features, attributes, characteristics, etc. collected by network monitor entity 280) stored at cloud entity data store 266.

Risk assessment system 272 may determine potential security risks associated with each of the devices or entities coupled (e.g., communicatively coupled) to the network 200. As depicted, risk assessment system 272 includes a CVE matching component 274 and a risk score component 276. In some examples, the CVE matching component 274 may extract keywords from one or more lists (e.g., databases, data stores, etc.) of CVEs that are relevant to the entities for which the CVEs may apply. For example, the CVE matching component 274 may extract several keywords including variations and combinations of structured and unstructured data provided by each CVE. The CVE matching component 274 may further obtain entity property data (e.g., from cloud entity data store 266) and determine identifying keywords, properties, etc., from the entity property data. The CVE matching component 274 may then compare the keywords extracted from the CVEs to the entity property data keywords to determine if any of the CVEs are associated with or correspond to an entity coupled (e.g., communicatively coupled) to the network, as described in more detail below with respect to FIGS. 3-6. Local risk assessment system 242 of the network monitor entity 280 may perform the same or substantially similar functions as the risk assessment system 272, locally.

Risk score component 276 of the risk assessment system 272 may calculate a risk score (e.g., a numerical representation of security risk) associated with each device 220-222 based at least in part on the CVEs determined to be associated with or correspond to the devices 220-222. For example, each CVE may indicate the vulnerabilities associated with a device (entity) which can then be used to calculate potential security risks that the device poses to the network. Cloud entity data store 266 is not subject to the resource conditions or limitations (e.g., processing power, storage, etc.) that may impact network monitor entity 280 (e.g., and local classification engine 240). Cloud entity data store 266 is a data store (e.g., a cloud entity database) of entity information that has been uploaded to classification system 262 (e.g., by one or more network monitor entities, for instance, network monitor entity 280). For example, the data in cloud entity data store 266 may include all the evidence (e.g., entity property data) associated with an entity, such as entity or device name, operating system, function, vendor/model, and host information from a variety of networks (e.g., that have network monitor entities configured to upload device information).

Figure 3:
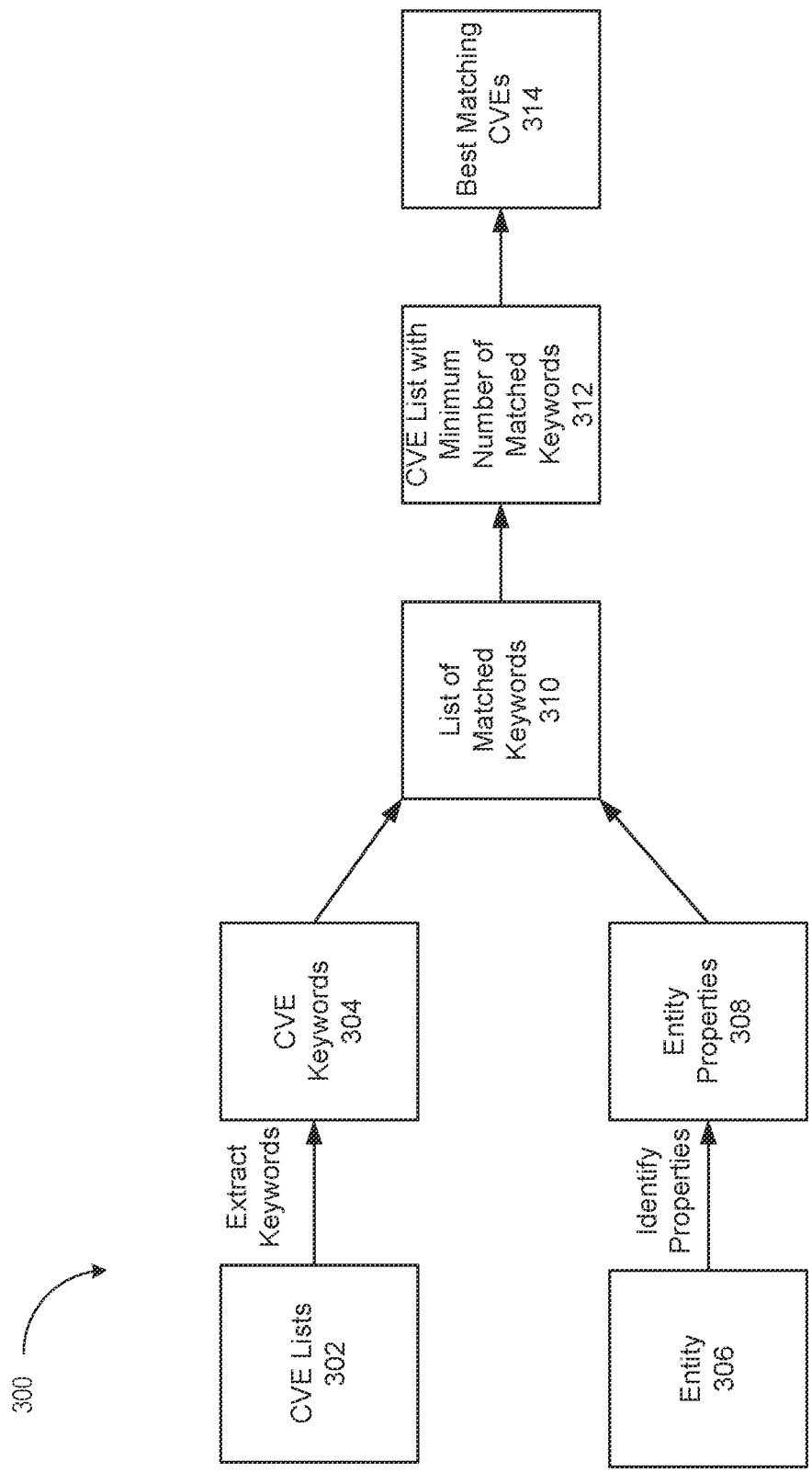
FIG. 3 depicts a system diagram illustrating a process for matching CVEs for an entity, according to embodiments of the present disclosure.
Figure 4:
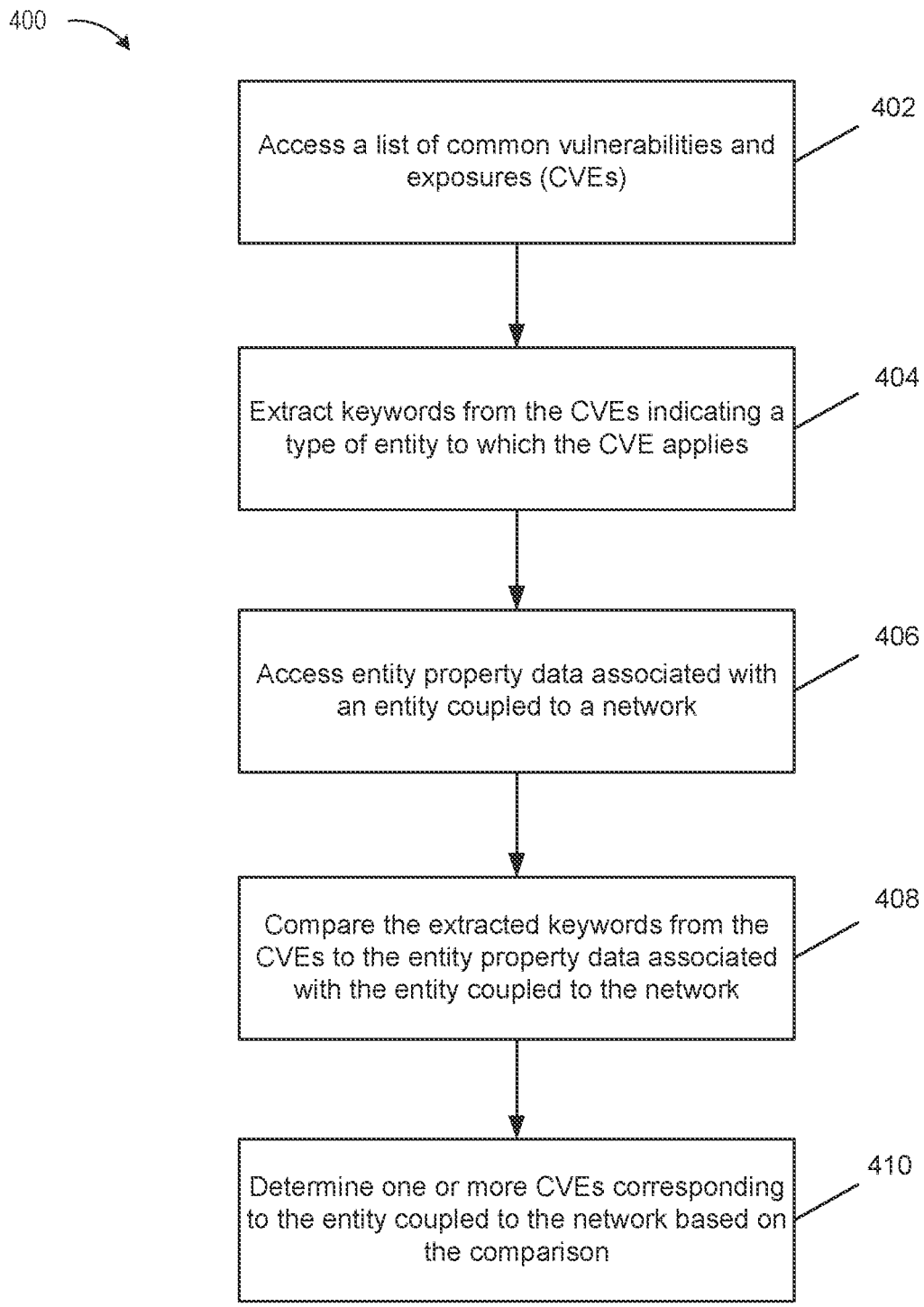
FIG. 4 depicts a flow diagram illustrating a process for CVE determination for a an entity of a network according to embodiments of the present disclosure.
Figure 5:
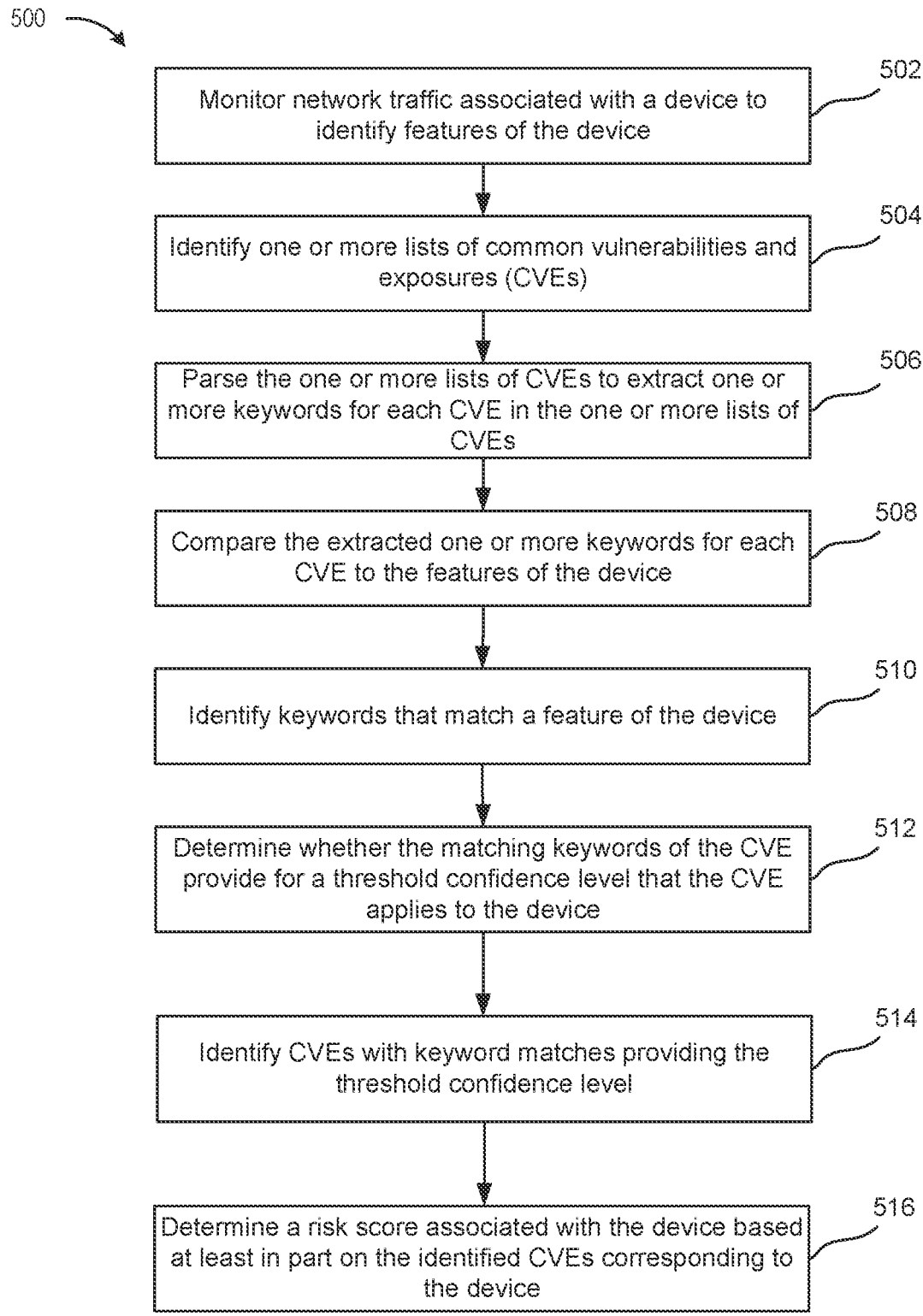
FIG. 5 depicts a flow diagram illustrating another process CVE identification for entities of a network according to embodiments of the present disclosure.

With reference to FIGS. 3-5, flowcharts 300-500 illustrate example operations used by various embodiments. Although specific operation blocks ("blocks") are disclosed in flowcharts 300-500, such blocks are examples. That is, embodiments are well suited to performing various other blocks or variations of the blocks recited in flowcharts 300-500. It is appreciated that the blocks in flowcharts 300-500 may be performed in an order different than presented, and that not all of the blocks in flowcharts 300-500 may be performed. The blocks of flowcharts 300-500 may be performed locally by an entity, in a cloud, or a combination thereof.

FIG. 3 depicts a flow diagram illustrating a high-level process 300 for CVE matching and determination for entities coupled to a network, according to embodiments of the present disclosure. Various portions of process 300 may be performed by different components (e.g., components of system 600) of an entity or device (e.g., network monitor entity 102, network monitor entity 280, or risk assessment system 272). Although specific components are depicted in FIG. 3, it should be appreciated that such components are examples. That is, embodiments are well suited to having various other components or variations of the components depicted in FIG. 3. It is appreciated that the components of FIG. 3 may operate with other components than those presented, and that not all of the components may be required to achieve the goals of the process 300 of the FIG. 3.

In some examples, processing logic (e.g., risk assessment system 272) identifies CVE lists 302. The CVE lists 302 may be publicly available or proprietary CVE lists for network capable computing devices. The processing logic may extract CVE keywords 304 from each of the CVEs. The CVE keywords 304 may be a string representing information identifying the type of device, operating system, vendor, etc., to which the CVE applies. The processing logic may identify an entity 306 for which applicable CVEs are to be determined or updated. For example, the entity 306 may be newly connected or added to the network (e.g., the network being monitored) or may include an update or modification for which additional, new, or different CVEs need to be identified to maintain up to date network security. The processing logic may retrieve entity properties 308 associated with the entity 306. The entity properties 308 may be retrieved from a profile of the entity 306 including information and attributes associated with the device. In some examples, the entity properties 308 may be determined based on a classification of the entity 306 such as a role of the entity 306. For example, the processing logic may parse and extract keywords from a string indicating a classification or type of the entity 306.

In some embodiments, the processing logic (e.g., risk assessment system 272) may compare the entity properties 308 with the extracted CVE keywords 304 to determine a list of matched keywords 310 for the entity 306. The list of matched keywords 310 may include some or all of the keywords that were matched between the entity properties 308 and the CVE keywords 304. However, some of the keywords may not be specific enough to determine, with confidence, that a CVE applies to the entity 306. Accordingly, in some embodiments, the processing logic may then identify a list of CVEs with a minimum number of matched keywords 312. For example, the processing logic may remove the keywords and the corresponding or associated CVEs from the matched keywords 312 for CVEs that only have a single matching keyword, or any other threshold number of matching keywords. In some examples, the processing logic may further refine the list of matches by identifying the best matching CVEs 314. The best matching CVEs 314 may be CVEs that include not only the minimum number of matched keywords but also matching keywords with a threshold specificity. For example, the best matching CVEs 314 may include not only vendor and operating system but also model and version numbers. Accordingly, the best matching CVEs 314 may indicate CVEs that have a high likelihood of corresponding to the entity 306.

FIG. 4 depicts a flow diagram of aspects of process 400 for CVE determination for devices (e.g., determining one or more CVEs associated with an entity) of a network in accordance with one implementation of the present disclosure. Various portions of process 400 may be performed by different components (e.g., components of system 600) of an entity or device (e.g., network monitor entity 102, network monitor entity 280, or local risk assessment system 242, risk assessment system 272, or combination thereof). Process 400 begins at block 402, where processing logic (e.g., network monitor entity 102, network monitor entity 280, or risk assessment system 272) accesses a list of common vulnerabilities and exposures (CVEs).

At block 404, the processing logic (e.g., risk assessment system 272) extracts keywords from the CVEs indicating a type of entity to which the CVE applies. For example, for the CVE-2012-1350 with one of the tags of "cpe:2.3:h:cisco:aironet_1040:-:*:*:*:*:*:*:*" the keywords extracted may include "cisco", "aironet 1040", "1040", and "aironet".

At block 406, the processing logic (e.g., local risk assessment system 242, risk assessment system 272, or combination thereof) accesses entity property data associated with an entity coupled to a network. Accessing entity property data may include monitoring network traffic associated with the device on the network (e.g., via passive monitoring, active monitoring, or a combination thereof). The processing logic may store the device property data from the network traffic locally at a monitoring device or provide the device property data to a central location, such as a cloud classification system as described with respect to FIG. 2. In some examples, accessing the entity property data may include accessing or retrieving the entity property data already stored for the entity. The entity properties for an example endpoint classified with vendor & model: "Cisco-Cisco AP Aironet 1040" may include "aironet 1040", "cisco ap aironet 1040", "aironet", "1040", "cisco", and "ap".

At block 408, processing logic (e.g., local risk assessment system 242, risk assessment system 272, or combination thereof) compares the extracted keywords from the CVEs to the entity property data associated with the entity coupled (e.g., communicatively coupled) to the network. The matching logic for the example CVE and entity properties above may include four matches of CVE keyword values with property data, vendor value is one of the matches, and one of the matches is a number (e.g., the model number matching).

At block 410, processing logic (e.g., local risk assessment system 242, risk assessment system 272, or combination thereof) determines one or more CVEs associated with or corresponding to the entity coupled to the network based on the comparison. In some examples, the processing logic determines whether the number of matching keywords exceeds a minimum number (e.g., a threshold). Additionally, the processing logic may determine whether a specificity for the matching keywords of a CVE and the entity exceeds a minimum specificity threshold. For example, the processing logic may determine that a specificity threshold is met if a vendor and model are matched, if a vendor, model, and version are matched, or any other specificity level requirements. Accordingly, the processing logic may identify CVEs that apply to an entity with high level of confidence/probability.

FIG. 5 depicts a flow diagram of aspects of process 500 for CVE determination for devices or entities of a network in accordance with one implementation of the present disclosure. Various portions of process 500 may be performed by different components (e.g., components of system 600) of an entity or device (e.g., network monitor entity 102, network monitor entity 280, or local risk assessment system 242 or risk assessment system 272, or a combination thereof).

Process 500 begins at block 502, where processing logic (e.g., network monitor entity 102 or network monitor entity 280) monitors network traffic associated with a device to identify features of the device.

At block 504, the processing logic (e.g., network monitor entity 102, network monitor entity 280, or local risk assessment system 242 or risk assessment system 272, or a combination thereof) identifies one or more lists of common vulnerabilities and exposures (CVEs). As described above with respect to FIG. 4, the processing logic may identify and access the CVEs from one or more publicly available or private sources of CVEs. The processing logic may retrieve the CVEs by downloading CVE documents, crawling a webpage to extract the CVEs, or performing any other technique for accessing and extracting the CVEs from the one or more CVE sources.

At block 506, the processing logic (e.g., network monitor entity 102, network monitor entity 280, or local risk assessment system 242 or risk assessment system 272, or a combination thereof) parses the one or more lists of CVEs to extract one or more keywords for each CVE in the one or more lists of CVEs. For example, as described at block 404 of FIG. 4, the processing logic may extract tokens, strings, etc., from the CVEs. The extracted keywords may each include one or more identifiers of the entities or type of entities to which the CVE applies. For example, the extracted keywords may include an operating system type, an operating system version, a device manufacturer, a MAC address range, a vendor or model, or any other strings or possible indicators extracted from the CVE. Additionally, the extracted keywords may include different combinations, lengths, detail, etc., of the strings extracted from the CVE. For example, one keyword of an entity may include the vendor, another keyword may include the vendor and model, another keyword may include the vendor, model, and software version, another keyword may include model and software version, and so forth including any combination of the parsed strings or tokens.

At block 508, processing logic (e.g., network monitor entity 102, network monitor entity 280, or local risk assessment system 242 or risk assessment system 272, or a combination thereof) compares the extracted one or more keywords for each CVE to the features of the device. For example, the processing logic may compare each keyword to each of the features of the device. In another example, the processing logic may perform a search of the device properties or features to determine if the keyword completely or partially matches a feature of the device (or entity).

At block 510, processing logic (e.g., network monitor entity 102, network monitor entity 280, or local risk assessment system 242 or risk assessment system 272, or a combination thereof) identifies keywords that match a feature of the device. The keywords that match a feature of the device may be included in a list or other data structure along with an identifier of the CVE from which the keyword is matched.

At block 512, processing logic (e.g., network monitor entity 102, network monitor entity 280, or local risk assessment system 242 or risk assessment system 272, or a combination thereof) determines whether the matching keywords of a CVE provide for a threshold confidence level that the CVE applies to the device. In some examples, the processing logic may additionally determine a number of keywords (e.g., a quantity of keywords) from each CVE that are matched to a feature of the device. In some examples, the processing logic may sort the CVEs by the number of keywords from each CVE that are matched with features of the device. In some examples, the features that are matched to keywords may be weighted to determine whether the threshold confidence level has been met. For example, the processing logic may determine the weight associated with each matched feature/keyword and calculate a total weighted confidence score for the CVE based on the weights.

At block 514, processing logic (e.g., network monitor entity 102, network monitor entity 280, or local risk assessment system 242 or risk assessment system 272, or a combination thereof) identifies CVEs with keyword matches providing the threshold confidence level. In some embodiments, the processing logic may filter out the CVEs with keyword matches that do not provide the threshold confidence level. Thus, the remaining list of CVEs may include the CVEs that include matching keywords that provide a confidence level above the threshold.

At block 516, processing logic (e.g., network monitor entity 102, network monitor entity 280, or local risk assessment system 242 or risk assessment system 272, or a combination thereof) determines a risk score associated with the device or entity based at least in part on the identified CVEs associated with or corresponding to the device or entity. In some embodiments, the identified CVEs may be a partial factor in determining a risk score of the device along with a classification of the device and monitored network traffic of the device. Additionally, the identified CVEs may each be associated with a risk level that contributes to the overall risk score of the device. In some examples, the identified CVEs may include one or more remediation actions that can be performed by a network security administrator, or a security component of the network (e.g., network monitor entity 102, network monitor entity 280, etc.) to reduce security exposure and risk associated with the device.

Figure 6:
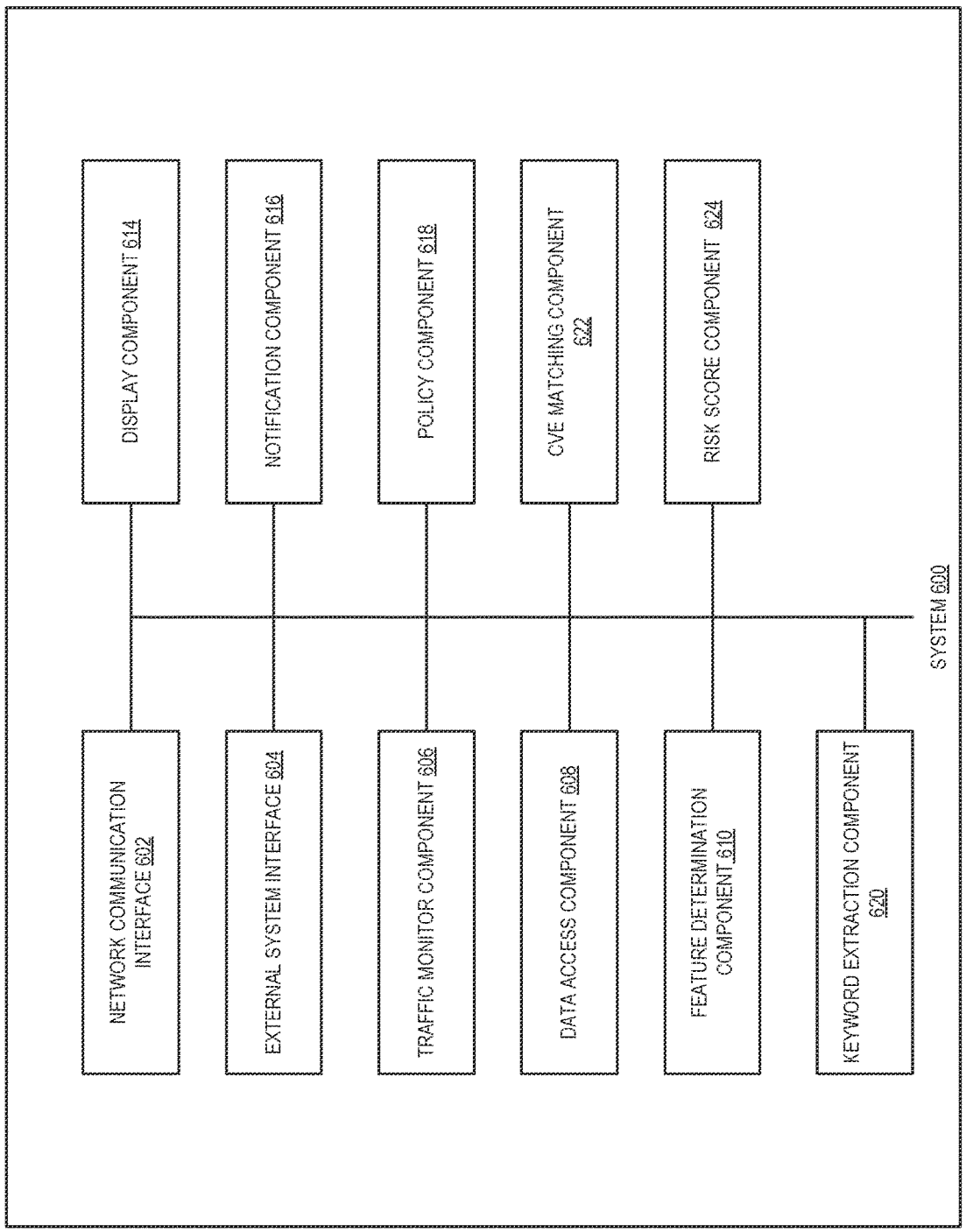
FIG. 6 depicts illustrative components of a system for CVE matching for entities of a network in accordance with one implementation of the present disclosure.

FIG. 6 illustrates example components used by various embodiments. Although specific components are disclosed in system 600, it should be appreciated that such components are examples. That is, embodiments are well suited to having various other components or variations of the components recited in system 600. It is appreciated that the components in system 600 may operate with other components than those presented, and that not all of the components of system 600 may be required to achieve the goals of system 600.

FIG. 6 depicts illustrative components of a system for identification of CVEs associated with an entity of a network in accordance with one implementation of the present disclosure. Example system 600 includes a network communication interface 602, an external system interface 604, a traffic monitor component 606, a data access component 608, a feature determination component 610, a display component 614, a notification component 616, a policy component 618, a keyword extraction component 620, a CVE matching component 622, and a risk score component 624. The components of system 600 may be part of a computing system or other electronic device (e.g., network monitor entity 102 or network monitor entity 280) or a virtual machine or device and be operable to monitor and one or more entities communicatively coupled to a network, monitor network traffic, determine one or more classifications of an entity, identify and match CVEs associated with an entity, perform a risk assessment of the entity, and perform one or more security or remediation actions, as described herein. For example, the system 600 may further include a memory and a processing device, operatively coupled to the memory, which may perform the operations of or execute the components of system 600. The components of system 600 may access various data and characteristics or features associated with an entity (e.g., network communication information) and data associated with one or more entities. It is appreciated that the modular nature of system 600 may allow the components to be independent and allow flexibility to enable or disable individual components or to extend, upgrade, or combination thereof components without affecting other components thereby providing scalability and extensibility. System 600 may perform one or more blocks of flow diagrams 300-500. In some embodiments the components of 600 may be part of network monitor device (e.g., network monitor entities 102 and 280), in the cloud, or the various components may be distributed between local and cloud resources.

Communication interface 602 is operable to communicate with one or more entities (e.g., network device 104, firewall 206, switch 210, other entities coupled thereto, devices 220-222, etc.) coupled to a network that are coupled to system 600 and receive or access information about entities (e.g., device information, device communications, device characteristics, features, etc.), access information as part of a passive scan, send one or more requests as part of an active scan, receive active scan results or responses (e.g., responses to requests), as described herein. The communication interface 602 may be operable to work with one or more components to initiate access to characteristics or determination of characteristics of an entity to allow determination of one or more features which may then be used for device compliance, asset management, standards compliance, classification, identification, etc., as described herein. Communication interface 602 may be used to receive and store network traffic for determining features, as described herein.

External system interface 604 is operable to communicate with one or more third party, remote, or external systems to access information including characteristics or features of an entity (e.g., to be used to determine a security aspects). External system interface 604 may further store the accessed information in a data store. For example, external system interface 604 may access information from a vulnerability assessment (VA) system to enable determination of one or more compliance or risk characteristics associated with the entity. External system interface 604 may be operable to communicate with a vulnerability assessment (VA) system, an advanced threat detection (ATD) system, a mobile device management (MDM) system, a firewall (FW) system, a switch system, an access point (AP) system, etc. External system interface 604 may query a third party system using an API or CLI. For example, external system interface 604 may query a firewall or a switch for information (e.g., network session information) about an entity or for a list of entities that are communicatively coupled to the firewall or switch and communications associated therewith. In some embodiments, external system interface 604 may query a switch, a firewall, or other system for information of communications associated with an entity.

Traffic monitor component 606 is operable to monitor network traffic to determine if a new entity has joined the network or an entity has rejoined the network and monitor traffic for analysis by data access component 608, feature determination component 610, keyword extraction component 620, CVE matching component 622, and risk score component 624, as described herein. Traffic monitor component 606 may have a packet engine operable to access packets of network traffic (e.g., passively) and analyze the network traffic. The traffic monitor component 606 may further be able to access and analyze traffic logs from one or more entities (e.g., network device 104, system 150, or aggregation device 106) or from an entity being monitored. The traffic monitor component 606 may further be able to access traffic analysis data associated with an entity being monitored, e.g., where the traffic analysis is performed by a third-party system.

Data access component 608 may be operable for accessing data including metadata associated with one or more network monitoring entities (e.g., network monitor entities 102 or 280), including features that the network monitoring entity is monitoring or collecting, software versions, the internal configuration of the network monitoring entity, entity classification information, entity properties, entity security information, etc. The data accessed by data access component 608 may be used by embodiments to perform classification including ensuring that the most up to date models, profiles, and other classification information is being used (e.g., by an attribute designation component 620). Data access component 608 may further access vertical or environment data and other user associated data, including vertical, environment, common type of entities for the network or network portions, segments, areas with classification issues, etc., which may be used for classification.

Data access component 608 may access data associated with active or passive traffic analysis or scans or a combination thereof. Information accessed by data access component 608 may be stored, displayed, and used as a basis for determination of CVEs for (or associated with) entities coupled to a network, as described herein.

Feature determination component 610 is configured to determine one or more features associated with an entity, as described herein. Feature determination component 610 may determine one or more features and associated values associated with an entity based on analysis (e.g., including extraction of features and values) of network traffic, as described herein. In some examples, a device attribute may be general attributes of a class or classes of devices while device features may be values associated with operation of individual devices, or entities. The features can then be stored and used by other components (e.g., keyword extraction component 620, CVE matching component 622, and risk score component 624) to determine CVEs for the devices of the network, as described herein.

Display component 614 is configured to optionally display one or more graphical user interfaces or other interfaces (e.g., command line interface) for depicting various information associated with entities, including entity classification and CVE determinations for entities on the network, as described herein. In some embodiments, display component 614 may display or render a network graph of entities including one or more device attributes or classifications, access rules associated with entities, other access rule information (e.g., access policies, access templates, etc.), or explanations of device attribute assignments or conflicts.

Notification component 616 is operable to initiate one or more notifications based on the results of one or more classifications, CVE identification, and other analysis of communications, as described herein. The notification may be any of a variety of notifications, e.g., IT ticket, email, SMS, a HTTP notification, conflict alerts, etc., as described herein.

Policy component 618 is operable for initiating or triggering one or more remediation actions or security actions according to one or more policies, e.g., based on one or more classifications, matched CVEs for entities, and entity risk scores, as described herein. Policy component 618 may further be configured to perform other operations including checking compliance status, finding open ports, etc. In some embodiments, policy component 618 may verify that an assignment of one or more access rules to one or more enforcements points has been properly assigned or configured. Policy component 618 may restrict network access, signal a patch system or service, signal an update system or service, etc., as described herein. The policy component 618 may thus, among other things, invoke automatically (e.g., without user or human interaction) patching, automatically updating, and automatically restrict network access of an entity (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Keyword extraction component 620 may identify and parse one or more lists of CVEs, or other security information databases, to extract keywords from the CVEs identifying entities to which the CVE applies. The CVE matching component 622 may compare features, attributes, or any other entity properties to the keywords extracted from the CVEs. The CVE matching component 622 may also determine whether a sufficient number or specificity of the matching keywords provides sufficient evidence that a CVE applies to an entity. The risk score component 624 may calculate a risk score for devices of the network based, at least in part, on the CVEs identified for each device.

Figure 7:
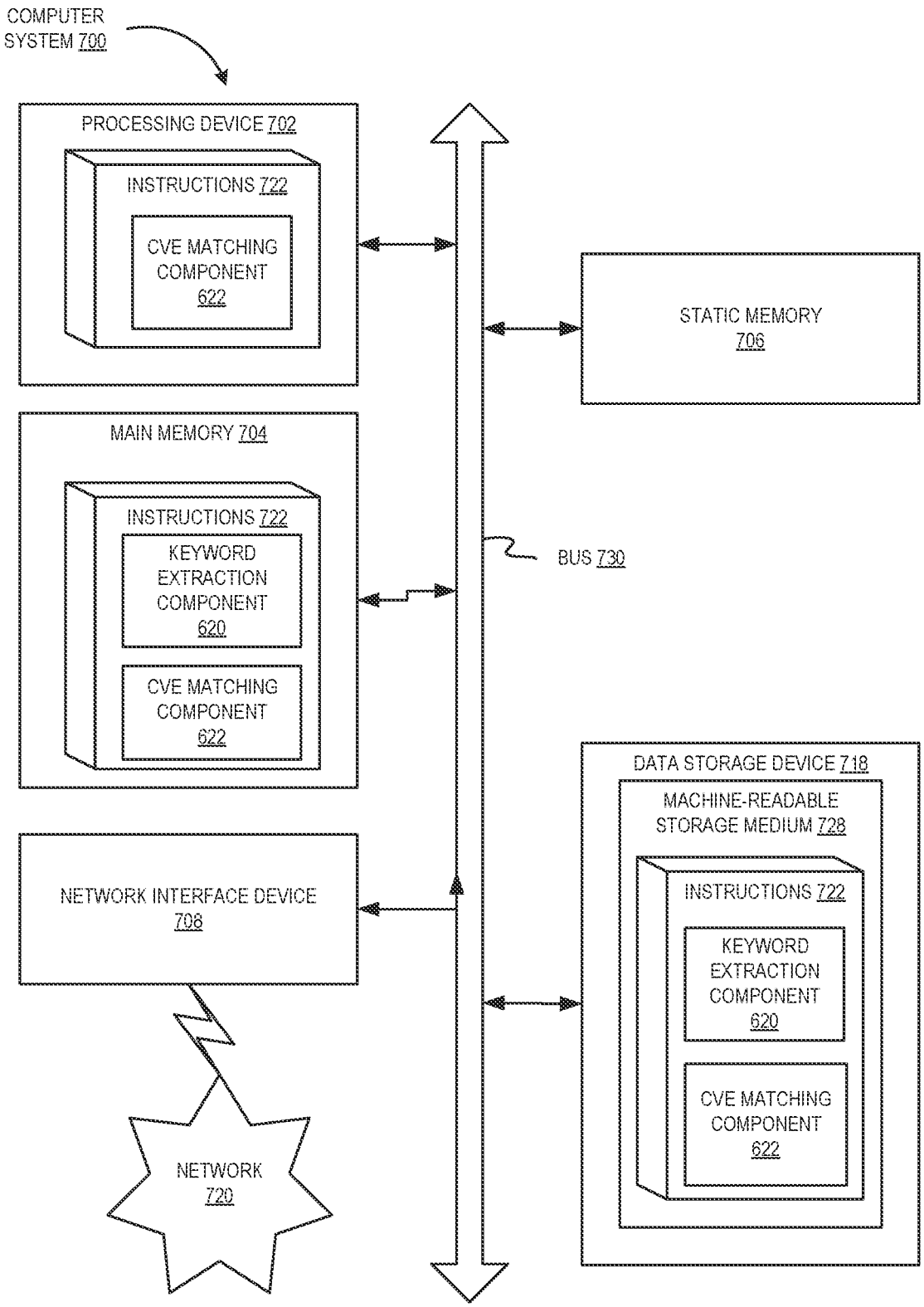
FIG. 7 is a block diagram illustrating an example computer system, in accordance with one implementation of the present disclosure.

FIG. 7 is a block diagram illustrating an example computer system, in accordance with one implementation of the present disclosure. FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as network monitor entity 102 or network monitor entity 280 running system 600 to perform CVE matching for entities of a network, as described herein.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722, which may be one example of system 600 shown in FIG. 6, for performing the operations and steps discussed herein.

The data storage device 718 may include a machine-readable storage medium 728, on which is stored one or more set of instructions 722 (e.g., software) embodying any one or more of the methodologies of operations described herein, including instructions to cause the processing device 702 to execute one or more modules of system 600 (e.g., keyword extraction component 620, CVE matching component 622, and risk score component 624). The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method of CVE identification and matching for entities of a network, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   determining a classification of an entity that is coupled to a network;
   accessing a plurality of entity security vulnerabilities and exposures;
   extracting one or more keywords from each of the entity security vulnerabilities and exposures of the plurality of entity security vulnerabilities and exposures;
   accessing entity property data associated with the entity coupled to the network;
   comparing, by a processing device, the one or more keywords from each of the entity security vulnerabilities and exposures of the plurality of entity security vulnerabilities and exposures to the entity property data associated with the entity coupled to the network;
   determining, by the processing device, one or more entity security vulnerabilities and exposures of the plurality of entity security vulnerabilities and exposures that are associated with the entity coupled to the network based on the comparing of the one or more keywords and the entity property data;
   monitoring network traffic with the entity; and
   determining a risk score associated with the entity based on the classification of the entity, the network traffic with the entity, and the one or more of the entity security vulnerabilities and exposures that are associated with the entity coupled to the network.

2. The method of claim 1, wherein each of the plurality of entity security vulnerabilities and exposures comprises a common vulnerabilities and exposures (CVEs).

3. The method of claim 1, wherein extracting the one or more keywords from each of the plurality of entity security vulnerabilities and exposures comprises:
parsing the entity security vulnerabilities and exposures to identify information indicating a type of entity to which the entity security vulnerabilities and exposures apply, wherein identifying information is extracted as the one or more keywords.

4. The method of claim 1, further comprising:
monitoring the network traffic associated with the entity to determine the entity property data associated with the entity.

5. The method of claim 1, wherein determining one or more of the entity security vulnerabilities and exposures of the plurality of entity security vulnerabilities and exposures that are associated with the entity coupled to the network comprises:
determining one or more matches between the one or more keywords of each of the one or more entity security vulnerabilities and exposures and the entity property data; and
determining that the one or more matches provide a threshold confidence level that each of the one or more entity security vulnerabilities and exposures correspond to the entity.

6. The method of claim 5, wherein determining that the one or more matches provide the threshold confidence level comprises:
determining that a number of the one or more matches for each of the one or more entity security vulnerabilities and exposures of the plurality of entity security vulnerabilities and exposures exceeds at least a threshold number of keyword matches.

7. A system comprising:
a memory; and
a processing device, operatively coupled to the memory, to:
determining a classification of an entity that is coupled to a network;
access a plurality of entity security vulnerabilities and exposures;
extract one or more keywords from each of the entity security vulnerabilities and exposures of the plurality of entity security vulnerabilities and exposures;
access entity property data associated with the entity coupled to the network;
compare the one or more keywords from each of the entity security vulnerabilities and exposures of the plurality of entity security vulnerabilities and exposures to the entity property data associated with the entity coupled to the network; and
determine one or more entity security vulnerabilities and exposures of the plurality of entity security vulnerabilities and exposures that are associated with the entity coupled to the network based on the comparing of the one or more keywords and the entity property data;
monitor network traffic with the entity; and
determine a risk score associated with the entity based on the classification of the entity, the network traffic with the entity, and the one or more of the entity security vulnerabilities and exposures that are associated with the entity coupled to the network.

8. The system of claim 7, wherein each of the plurality of entity security vulnerabilities and exposures comprises a common vulnerabilities and exposures (CVEs).

9. The system of claim 7, wherein to extract the one or more keywords from each of the plurality of entity security vulnerabilities and exposures, the processing device is to:
parse the entity security vulnerabilities and exposures to identify information indicating a type of entity to which the entity security vulnerabilities and exposures apply, wherein identifying information is extracted as the one or more keywords.

10. The system of claim 7, wherein the processing device is further to:
monitor the network traffic associated with the entity to determine the entity property data associated with the entity.

11. The system of claim 7, wherein to determine one or more of the entity security vulnerabilities and exposures of the plurality of entity security vulnerabilities and exposures that are associated with the entity coupled to the network, the processing device is to:
determine one or more matches between the one or more keywords of each of the one or more entity security vulnerabilities and exposures and the entity property data; and
determine that the one or more matches provide a threshold confidence level that each of the one or more entity security vulnerabilities and exposures correspond to the entity.

12. The system of claim 11, wherein to determine that the one or more matches provide a threshold confidence level, the processing device is to:
determine that a number of the one or more matches for each of the one or more entity security vulnerabilities and exposures of the plurality of entity security vulnerabilities and exposures exceeds at least a threshold number of keyword matches.

13. A non-transitory computer readable storage medium including instructions that, when executed by a processing device, cause the processing device to:
determining a classification of an entity that is coupled to a network;
access a plurality of entity security vulnerabilities and exposures;
extract one or more keywords from each of the entity security vulnerabilities and exposures of the plurality of entity security vulnerabilities and exposures;
access entity property data associated with the entity coupled to the network;
compare, by the processing device, the one or more keywords from each of the entity security vulnerabilities and exposures of the plurality of entity security vulnerabilities and exposures to the entity property data associated with the entity coupled to the network; and
determine, by the processing device, one or more entity security vulnerabilities and exposures of the plurality of entity security vulnerabilities and exposures that are associated with the entity coupled to the network based on the comparing of the one or more keywords and the entity property data;
monitor network traffic with the entity; and
determine a risk score associated with the entity based on the classification of the entity, the network traffic with the entity, and the one or more of the entity security vulnerabilities and exposures that are associated with the entity coupled to the network.

14. The non-transitory computer readable storage medium of claim 13, wherein each of the plurality of entity security vulnerabilities and exposures comprises a common vulnerabilities and exposures (CVEs).

15. The non-transitory computer readable storage medium of claim 13, wherein to extract the one or more keywords from each of the plurality of entity security vulnerabilities and exposures, the processing device is to:
   parse the entity security vulnerabilities and exposures to identify information indicating a type of entity to which the entity security vulnerabilities and exposures apply, wherein identifying information is extracted as the one or more keywords.

16. The non-transitory computer readable storage medium of claim 13, wherein the processing device is further to:
   monitor the network traffic associated with the entity to determine the entity property data associated with the entity.

17. The non-transitory computer readable storage medium of claim 13, wherein to determine one or more of the entity security vulnerabilities and exposures of the plurality of entity security vulnerabilities and exposures that are associated with the entity coupled to the network, the processing device is to:
   determine one or more matches between the one or more keywords of each of the one or more entity security vulnerabilities and exposures and the entity property data; and
   determine that the one or more matches provide a threshold confidence level that each of the one or more entity security vulnerabilities and exposures correspond to the entity.

* * * * *